United States Patent Office 3,103,629
Patented Sept. 10, 1963

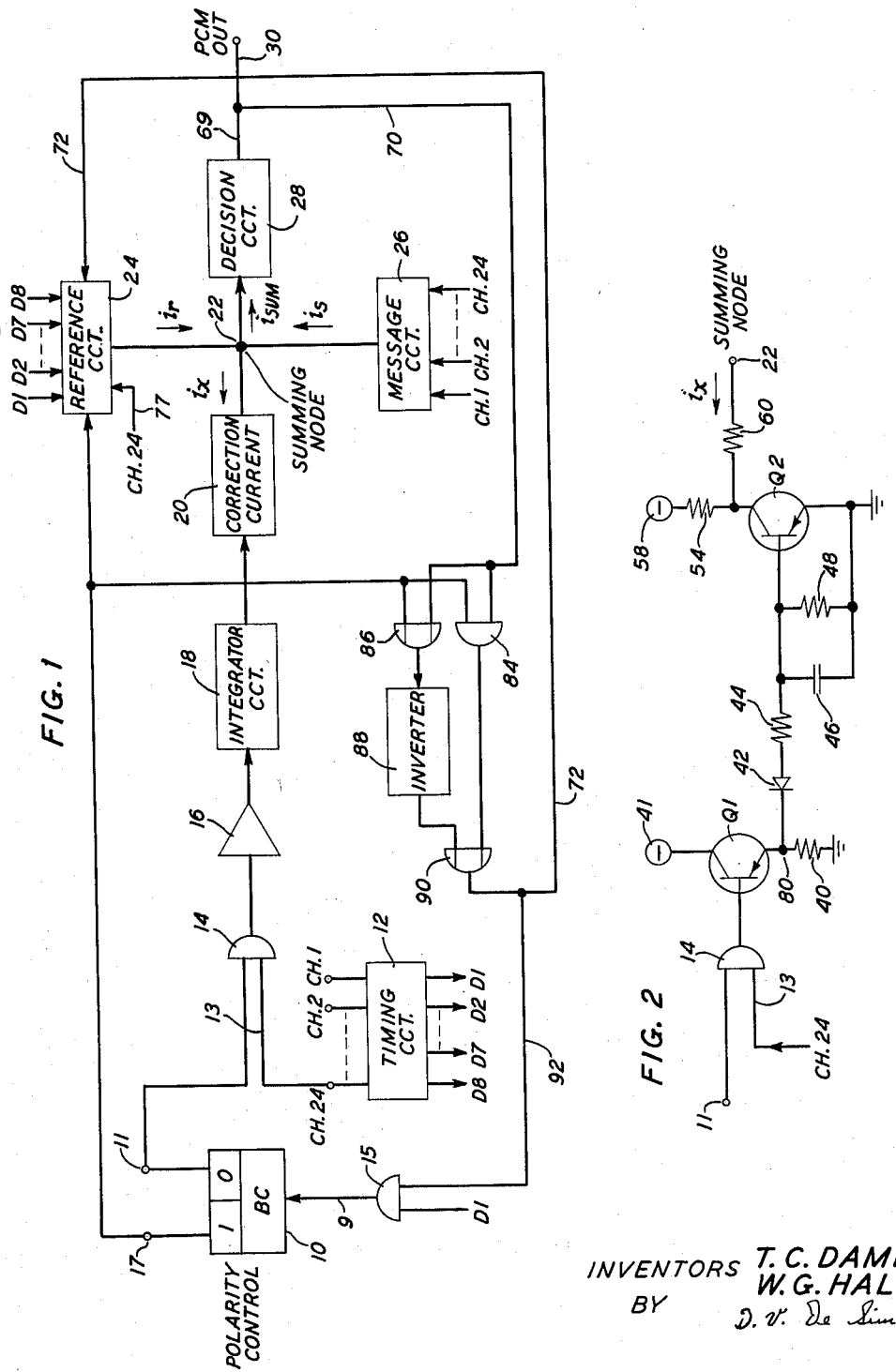

3,103,629
SELF-ADJUSTING ENCODER
Theodore C. Damen, South Orange, and William G. Hall, Morris Township, Morris County, N.J., assignors to Bell Telephone Laboratories, Incorporated, New York, N.Y., a corporation of New York
Filed Dec. 29, 1961, Ser. No. 163,221
7 Claims. (Cl. 325—38)

This invention relates to pulse code modulation (PCM) systems. More specifically, it relates to encoders that convert message samples into a pulse code.

The advantages of PCM systems over analogue systems, in which a modulating function continuously varies the amplitude, phase, or frequency of a sinusoidal carrier, have been known long enough to obviate the need for elaboration at this time. The outstanding advantage of PCM, it will be recalled, is that it permits the rejuvenation of signals as they are conveyed over a transmission medium. Analogue signals, which include amplitude-modulated pulses, can of course be amplified (along with any accumulated noise) during their transmission, but not recreated, noise-free, as can a binary pulse train.

Inexorably, however, advantages seem always to be accompanied by disadvantages. So it is with PCM that the bandwidth requirements, the inherent quantization error, and the stringent demands for speed and accuracy in the conversion processes (analogue to digital and vice versa), tend somewhat to pique the PCM enthusiast. It is to the amelioration of the last of these disadvantages that the present invention is directed. It is, accordingly, an object of the invention to improve the accuracy of PCM encoders and, more specifically, to eliminate spurious signals from the PCM encoding process that compares message samples with a reference signal.

In accordance with the invention, a history of the slow internal drifts that plague the summing node of a sequential comparison encoder is maintained and periodically modified. A full-circle, analogue to digital to analogue transformation of these drifts produces a corrective current, which is then set off against the drifts so that a truly representative code may be produced. The invention will be better understood after considering the following detailed description and the drawing to which it relates. In the drawing:

FIG. 1 is a block schematic diagram of a sequential comparison encoder arranged in accordance with the invention; and FIG. 2 is a schematic diagram, also in accordance with the invention, which shows the corrective portion of FIG. 1 in greater detail.

FIG. 1 broadly depicts an encoder known variously as a "sequential comparison" encoder (because methodically generated reference levels are sequentially compared with each message sample), a "weighing" encoder (so-called because reference standards are balanced against each message sample on what is effectively an electrical weighing scale), or a "feedback" encoder (in view of the control pulses fed back to regulate the generation of reference currents). We shall call the encoder of FIG. 1 a "sequential comparison" encoder, not in any effort to endorse this usage, but only because of its apparent prevalence. In any event, to avoid a partial or total eclipse of the invention by myriad well-known and irrelevant details, FIG. 1 is general in content, but sufficiently detailed to facilitate its description and understanding.

The focal point of the encoder is the summing node 22. It is here that the reference current $i_r$ from the reference circuit 24 is set off against the message current $i_s$ from the message circuit 26. There, a current $i_x$ is also encountered. The sum of these currents is the current $i_{sum}$. Conveniently, we should note at this time that the currents $i_r$, $i_s$ $i_x$, and $i_{sum}$, as they are shown, are complex quantities, since FIG. 1 gives us not the faintest notion of which way these currents should be flowing. However, we do know that the currents $i_r$ and $i_s$ are of opposite polarity, for during the course of encoding each sample, we want $i_r$ to cancel $i_s$. And, as we shall see when we get to FIG. 2, the current $i_x$ does flow in the direction indicated because of bias requirements that have illustratively been assumed for the decision circuit 28.

Now, it is an unfortunate, and sometimes unpalatable, consequence of putting PCM theory into practice that certain elements do not always perform the way they are expected to. For one thing, to age is to change, be the increment ever so small, and so it is that the conductive properties of resistors and transistors change with time. In the encoder of FIG. 1 these changes may cause drift currents to render erroneous and futile the decisions of the decision circuit 28. Another source of dismay is current drift due to temperature changes. We may assume that a skilled practitioner could devise elaborate measures for striking at the source of these drifts. But such measures, superimposed on an already constrained encoder that must speedily process enormous amounts of information in fleeting intervals, would perhaps render PCM the electronic analogue of the evolutionally foredoomed dinosaur. There was just too much of him. It is therefore to an economically and technically attractive method of combatting drift currents at the summing node that the present invention is directed.

In FIG. 1 the currents $i_r$, $i_s$, and $i_x$ are combined, as we have seen, at the summing node 22. The sum of these currents, the current $i_{sum}$, is then appraised by the decision circuit 28, which may comprise a conventional summing amplifier and a Schmitt multivibrator (see, e.g., "The Schmitt Multivibrator," Wireless World, volume 64, page 344, July 1958). The operation of these components is described in Patent No. 3,016,528, which issued Jan. 9, 1962, to C. P. Villars, to cite but one explanatory source.

In response to the polarity of the current $i_{sum}$, the decision circuit 28 develops the PCM representation of the message current $i_s$. The PCM output at the terminal 30 is a succession of pulses ("1's") and spaces ("0's"). A binary "1" indicates one or the other of two conditions—namely, that the current $i_{sum}$ is either negative or positive with respect to some reference.

By way of example, let us assume that a binary "1" tells us that the current $i_{sum}$ is negative with respect to a quiescent level (normally negative) which, so far as the decision circuit 28 is concerned, is effectively zero (we shall have more to say about this later). The encoder wants, therefore, to make $i_{sum}$ more positive. It does this via the feedback bus 72 during the course of encoding a message sample, and via the feedback bus 92 when the encoding of each sample is begun.

The main feedback bus 70 is an input to both the AND gate 84 and the OR gate 86. The other input of both the OR gate 86 and the AND gate 84 is connected to the output 17 of the binary cell, or binary counter 10 (depicted conventionally and labeled "BC") which, as we shall see, controls the polarity of the reference current $i_r$.

The output of the OR gate 86 is connected to the inverter 88, a conventional device which, in PCM terminology, produces a binary "0" output in response to a binary "1" input, and vice versa. The output of the AND gate 84 and that of the inverter 88 are the inputs of the OR gate 90. If either the inverter 88 or the AND gate 84 supplies a pulse (binary "1") to the OR gate 90, a pulse will be supplied to the input 92 of the AND gate 15.

We should note that the logical interrelationships of the elements 84, 86, 88, and 90 are such that the input 92 of the AND gate 15 will be in the binary "1" state only when one or the other of two conditions prevails. These conditions are manifest when the output 17 of the binary cell 10 and the feedback bus 70 are either both in the binary "0" state or both in the binary "1" state. When they are both in the binary "0" state, the inverter 88 will supply a pulse via the OR gate 90 to the input 92 of the AND gate 15 and to the input 72 of the reference circuit 24. When they are both in the binary "1" state a pulse will be so supplied by the AND gate 84.

The reference circuit 24 typically may consist of a bipolar source of reference potential, a weighted network, and network switching means, all conventional elements (not shown in FIG. 1), which are illustrated in the above-cited Villars patent and also, for example, in a copending application, Serial No. 154,452, filed by W. G. Hall on November 24, 1961.

Before we proceed further, we had better agree to a system of expressions delineating the time domain. Let us be of one mind when we speak of "time slots," "channels," and "frames."

The illustrative encoder of FIG. 1 is for a time division multiplex system. Imagine a clock that is numbered clockwise from 1 to 24, instead of from 1 to 12, and has a single hand rotating at a constant angular velocity (the sampling frequency) over the 24 segments of the clock circle. Now imagine message sources connected individually to the clock segments so that the clock hand interrogates each source once during each cycle. We shall call these cycles, "frames." Our imagined clock is part of the message circuit 26, which comprises message sources (e.g., telephone transmitters), a multiplexer (our clock), and the usual filters. All of these components (not shown) are conventional and are described, for example, in Patent No. 2,610,295, which issued September 9, 1952, to R. L. Carbrey, and Patent No. 2,449,467, which issued to W. M. Goodall on September 14, 1948.

The timing inputs which are labeled "CH. 1" (channel 1), "CH. 2," . . . "CH. 24" and emanate from the timing circuit 12, are what drive the hand of our clock (the multiplexer). These 24 preassigned intervals of time we shall call "channels." They are periodically recurring intervals and are associated with message sources, from each of which a sample is taken once during each frame. Each of these samples is converted into a binary train of pulses and spaces, and each of these pulses and spaces is embraced by a subinterval of time called a "time slot." In sum, the channels (which correspond to the hours of an ordinary timepiece) are divided into so many time slots (that correspond to the minutes of an ordinary timepiece), and each frame (which corresponds to one full swing around an ordinary timepiece) is divided into so many channels.

The timing circuit 12 (which may be of the type presently used in PCM carrier systems) has two sets of timing outputs. One set (D1, D2 . . . D7, D8) times the occurrence of time slots. The other set (CH. 1, CH. 2 . . . CH. 24) times the occurrence of channels.

It should be noted that the 24th channel, which would normally be used to accommodate message information, is, in accordance with the invention, used in our illustrative embodiment to check the status of the summing node 22. Our undepicted multiplexer is therefore connected, not to a message source during channel 24, but to ground. Accordingly, no message current $i_s$ is conveyed to the summing node 22 during the 24th channel.

By setting aside the 24th channel to check the status of the summing node 22, we are enabled to correct drifts at that node. We have insured that no message current $i_s$ is extant during the 24th channel. We must also prevent the generation of the reference current $i_r$ during that time. This exclusion is accomplished by the input 77 of the reference circuit 24. The output CH. 24 of the timing circuit 12 resets all of the gates (not shown, but see the above-cited Villars patent) that control the flow of the reference current $i_r$, so that none of this current flows during the 24th channel. During channel 24, whatever current is present at the node 22 must therefore be the current $i_x$, with or without superadded drift currents.

The AND gates 15 will supply a pulse to the input 9 of the binary counter 10 only when there is a concurrence of pulses at its inputs (one from the D1 output of the timing circuit 12 and the other from the OR gate 90). Though the operation of a binary counter is well known, we may note that its state of equilibrium is changed every time a pulse is supplied to its input 9. And every time this occurs, the binary states of the outputs 11 and 17 are interchanged.

In passing, we may also note that the output 17 of the binary counter 10 will cause the reference circuit 24 to supply reference current of appropriate polarity (opposite to that of the message current $i_s$) to the summing node 22. When the reference source (not shown) in the reference circuit 24 is switched, as, for example, in the above-cited Villars patent, it will provide a reference current $i_r$ whose polarity is opposite that of the message current $i_s$. The binary state of the output 17 will determine the polarity of the reference current. Note that this binary state is subject to change at the beginning of each channel, i.e., periodically at time D1. The AND gate 15 (which motivates the binary counter 10) can be enabled only at this time.

It was mentioned that the 24th channel is set aside for purposes of error checking. During this channel, the message current $i_s$ and the reference current $i_r$ are discontinued. The only current remaining at the summing node 22 is thus the current $i_x$. We shall assume (since indeed this is ordinarily the case) that the current $i_x$ provides bias current for the active input element (for example, a transistor) of the decision circuit 28. Normally, this current is such that the decision circuit 28 interprets it as zero level. We shall also assume that this current, needs to provide a negative bias and is therefore negative. In accordance with the invention, therefore, drifts at the summing node 22 are corrected by making the current $i_x$ more or less negative. The invention could also be implemented by making a positive bias current more or less positive.

We have noted that the current $i_x$, if unaffected by drift currents, has a magnitude which causes the decision circuit 28 to produce a zero code during the 24th channel. In other words, so far as the decision circuit 28 is concerned, the summing node 22 is then effectively at a zero level.

Now, if we assume that a negative drift current (resulting from, say, a derelict transistor in the reference circuit 24, or the decision circuit 28, or the message circuit 26) causes the current $i_x$ to become more negative than normal (i.e., negative with respect to effective zero), the decision circuit 28 will, during the 24th channel, when neither $i_r$ nor $i_s$ is supplied to the summing node 22, react to this abnormal value of $i_x$ by producing a binary "1" at its output 69. This is in keeping with our previous assumption that the decision circuit 28 will produce a binary "1" output whenever the summing node 22 is negative with respect to the normal value of $i_x$, i.e., negative with respect to effective zero. Conversely, when the summing node 22 is positive with respect to effective zero, the decision circuit 28 will produce a binary "0" output.

In accordance with the invention, it is the purpose of the circuitry interconnecting the output 11 of the binary counter 10 and the summing node 22 to make automatic corrections for current drifts at the node 22. We have assumed that a negative drift current has caused the current $i_x$ to become more negative than it normally is. The feedback bus 70 is accordingly in the binary "1" state. We may assume that the output 17 of the binary counter 10 is also in the binary "1" state. The AND gate 84 is thus enabled, as is the OR gate 90, and the input 92 of the AND gate 15 is in readiness to join with the D1 input (the D1 input, as we have seen, is impulsed at the commencement of the first time slot of each channel) to enable AND gate 15. The AND gate 15, in turn, will cause the state of equilibrium of the binary counter 10 to be changed.

When the binary counter 10 changes state, its output 11, as we have seen, will be switched into the binary "1" state. Now the pulse initiating the 24th channel, which is supplied by the timing circuit 12 to the AND gate 14, will be coincident with the binary "1" state of the output 11 of the binary counter 10. The AND gate 14 is therefore enabled and, in turn, supplies a pulse to the amplifier 16, which provides the requisite current gain. Pulses emanating from the amplifier 16 are then integrated by the integrator 18 which has, as we shall see when we get to FIG. 2, a built-in "erasing circuit" that will erase a specified potential level (corresponding to the amplitude of one pulse from the amplifier 16) during an interval equal to at least two frames, but significantly less than the period of fluctuation of the drift current at the summing node 22. This period of fluctuation would be statistically or experimentally determined in any given situation.

The current that accumulates in the integrator circuit 18 controls the correction circuit 20, which, for the illustrative example we are considering here (we have assumed that the current $i_x$ has been rendered more negative by a drift current), will cause the current $i_x$ to become less negative. This process will be repeated every 24th channel so that if the correction circuit 20 "over corrects," the over correction will itself be rectified during the next 24th channel.

The integrator circuit 18 and the correction circuit 20 are shown in detail in the schematic circuit of FIG. 2 and we shall now proceed to a description of that schematic circuit.

In FIG. 2, the AND gate 14, in response to coincident stimuli at its inputs 11 and 13, will supply a negative pulse to the base electrode of the transistor Q1. This pulse will cause the transistor Q1 to conduct. Current will flow from ground reference level through the load resistor 40 and the emitter-collector path of the transistor Q1 to the negative reference source 41, which supplies collector bias voltage for the transistor Q1. When the transistor Q1 is thus rendered conductive, the juncture 80 becomes more negative. This causes the transistor Q2 to conduct and a charge to be built up on the capacitor 46. The transistor Q1, it will be noted, is connected in the common collector (emitter-follower) configuration.

The diode 42 allows the capacitor 46 to charge and also prevents the discharge of this capacitor via the juncture 80. The resistor 44, a current limiting resistor, limits the rate at which charges are built up on the capacitor 46.

The capacitor 46 and the resistor 48 comprise a timing circuit. They constitute the "erasing circuit" we spoke about earlier. Their values are related so that a charge equivalent to the amplitude of a single pulse from the transistor Q1 will be discharged through resistor 48 over a period equal to at least two frames, but significantly less than the period of fluctuation of drift current at the summing node 22. By "significantly less" we mean at least an order of magnitude less.

The transistor Q2 acts as an automatic potentiometer. As a negative charge is built up on the capacitor 46, the transistor Q2 becomes more conductive. This in turn makes the current $i_x$ less negative, since current due to the source 58 is shared by both the summing node 22 and the collector-emitter circuit of the transistor Q2 to a degree dependent upon the conductivity state of transistor Q2. If and when the charge on the capacitor 46 has been completely bled by the resistor 48, the transistor Q2 will be turned off and the current $i_x$ will be maximally negative, since the summing node 22 need then no longer share current with the transistor Q2. Forced to this level by the circuit of FIG. 2, the current $i_x$ will compensate for drift currents which have driven the summing node 22 maximally positive with respect to the effective zero level of the current $i_x$.

When the transistor Q2 is rendered fully conductive by the capacitor 46, the current $i_x$ will be at its least negative level, since the transistor Q2 now conducts most of the current due to the source 58. This will enable the current $i_x$ to compensate for large negative drift currents. We can see, therefore, that the conductivity state of the transistor Q2 determines the degree of negativity of the current $i_x$. Negative or positive drift currents are thus automatically offset so that the decision circuit 28 will view the sum of $i_x$ and any drift currents as effective zero, and supply to the PCM output terminal 30 a code truly representative of the message current $i_s$.

The circuitry discussed above is illustrative and should not be construed as limiting the spirit or scope of the invention.

What is claimed is:

1. An encoder for the conversion of message currents to a pulse code comprising a source of message current, a source of reference current, a source of bias current, a summing node, means for conveying each of said currents to said summing node, means for converting the algebraic sum of currents present at said node into a pulse code train, said bias current normally producing a code value of zero in the absence of said message and reference currents, means for preventing the flow of said message and reference currents to said summing node during periodically initiated intervals, pulse-generating means responsive to said code train during said intervals for ascertaining any deviation of said bias current from its normal value, integrator means coupled to said pulse-generating means for accumulating pulses representative of such deviations, and means responsive to said integrator means for maintaining said bias current substantially at its normal level in the absence of said message and reference currents.

2. An encoder in accordance with claim 1 in which said integrator means comprises means for erasing said accumulated pulses over a period at least equal to two of said periodically initiated intervals.

3. An encoder for the conversion of message currents to a pulse code comprising a source of message current, a source of reference current, a source of bias current, a summing node, means for conveying each of said currents to said summing node, means for converting the algebraic sum of currents present at said node into a pulse code train, said bias current normally producing a code value of zero in the absence of said message and reference currents, means for preventing the flow of said message and reference currents to said summing node during periodically initiated intervals, an AND gate having a pair of inputs and an output, means for enabling one of said inputs during each of said intervals, means responsive to said pulse code train for enabling the other of said AND gate inputs, integrating means, means for conveying stimuli from the output of said AND gate to said integrating means, and means responsive to the integrations of said integrating means for varying the magnitude of said bias current at said summing node.

4. An encoder in accordance with claim 3 in which said means for conveying stimuli from the output of said AND gate to said integrating means comprises a transistor arranged in the common collector configuration with its base electrode connected to receive stimuli from said AND gate output and its emitter electrode connected to supply stimuli to said integrating means.

5. An encoder as in claim 3 wherein said means responsive to the integrations of said integrating means comprises a transistor arranged in the common emitter configuration with its base electrode connected to said integrator means and its collector electrode coupled to both said source of bias current and said summing node.

6. In a feedback comparison encoder of the type in which message samples are each compared with a stepped sequence of reference currents to convert said samples to a pulse code, a source of message current, a source of reference current, a summing node coupled to both said source of message current and said source of reference current, a decision circuit coupled to said node to convert the algebraic sum of currents there present into said pulse code, means timed to periodically interrupt the flow of message and reference currents to said summing node, said summing node normally being at an effective zero level during the interruptions by said last-named means, means coupled to said decision circuit and operative during said interruptions to recognize any deviation from said effective zero level and to produce a signal whenever said deviation is of a specified polarity with respect to said effective zero level, an integrator circuit coupled to said last-named means for recording each said signal, said integrator circuit including means for retaining each said signal for a predetermined length of time only, and means, intercoupling said integrator means and said summing node and responsive to the signal accumulation in said integrator means, to offset deviations of said summing node from effective zero.

7. An encoder in accordance with claim 6 in which said integrator means includes means for gradually erasing each said signal over a period encompassed by substantially two of said periodic interruptions.

No references cited.